(12) United States Patent
George et al.

(10) Patent No.: US 7,680,088 B2
(45) Date of Patent: Mar. 16, 2010

(54) HIGH SPEED DATA AND COVERAGE USING PERSONAL AREA NETWORK

(75) Inventors: Thomas George, Dunwoody, GA (US); Iyer Krishnan, Alpharetta, GA (US)

(73) Assignee: Nokia Corporation, Espoo (FI)

( * ) Notice: Subject to any disclaimer, the term of this patent is extended or adjusted under 35 U.S.C. 154(b) by 867 days.

(21) Appl. No.: 11/337,220

(22) Filed: Jan. 20, 2006

(65) Prior Publication Data
US 2007/0171852 A1 Jul. 26, 2007

(51) Int. Cl.
*H04W 4/00* (2009.01)
*H04W 4/08* (2009.01)
*H04W 36/00* (2009.01)

(52) U.S. Cl. .................. 370/338; 370/328; 370/331; 455/436

(58) Field of Classification Search ................ 370/328, 370/338, 449
See application file for complete search history.

(56) References Cited

U.S. PATENT DOCUMENTS

| | | | |
|---|---|---|---|
| 6,636,491 B1* | 10/2003 | Kari et al. ................ 370/328 |
| 2002/0032800 A1* | 3/2002 | Puuskari et al. ........... 709/246 |
| 2003/0152042 A1* | 8/2003 | Soininen et al. ........... 370/310 |
| 2004/0109455 A1* | 6/2004 | Jouppi et al. .......... 370/395.52 |
| 2005/0083899 A1* | 4/2005 | Babbar et al. .............. 370/342 |
| 2005/0089034 A1* | 4/2005 | Sakata et al. .............. 370/389 |
| 2005/0201300 A1* | 9/2005 | Bridgelall ................. 370/254 |
| 2006/0034195 A1* | 2/2006 | Blaiotta et al. ............. 370/261 |
| 2006/0133319 A1* | 6/2006 | Kant ...................... 370/331 |
| 2006/0140150 A1* | 6/2006 | Olvera-Hernandez et al. ...................... 370/331 |
| 2007/0066303 A1* | 3/2007 | Ala-Luukko .............. 455/436 |
| 2008/0062958 A1* | 3/2008 | Jonsson et al. ............ 370/350 |

OTHER PUBLICATIONS

Alamouti, S.M., "A Simple Transmit Diversity Technique for Wireless Communications", IEE Journal on Select Areas in Communications, vol. 16, No. 8, Oct. 1998, pp. 1451-1458.
Hochwald, B., et al., "A Transmitter Diversity Scheme for Wideband CDMA Systems Based on Space-Time Spreading", IEEE Journal on Selected Areas in Communications, vol. 19, No. 1, Jan. 2001, pp. 48-60.
Rosenberg, J., et al., "SIP: Session Initiation Protocol", © The Internet Society, 2002, 269 pgs., Jun. 2002.
Johnson, D.B., et al., "The Dynamic Source Routing Protocol for Mobile Ad Hoc Networks (DSR)", IETF MANET Working Group, Internet-Draft, Jul. 19, 2004, 107 pgs.

* cited by examiner

*Primary Examiner*—Nick Corsaro
*Assistant Examiner*—Tangela T. Chambers
(74) *Attorney, Agent, or Firm*—Harrington & Smith (57) ABSTRACT

Disclosed is a method, apparatus and computer program product to achieve enhancements in data transfer speed and reliability. In accordance with a method to operate a wireless device there is provided establishing a first connection path with a wireless network using a first long range transceiver; establishing a second connection path with the wireless network via a short range transceiver with at least one other wireless device that uses a second long range transceiver to establish the second connection path to the wireless network, and at least one of transmitting and receiving information using the first long range transceiver and, via the short range transceiver, the second long range transceiver.

15 Claims, 10 Drawing Sheets

Figure 4. Network assisted UE based Solution – Scenario2a

Figure 5. Network assisted UE based Solution – Scenario2b (Single SIP Solution)

Figure 6. Network assisted UE based Solution – Scenario2c (GGSN Paging Solution)

Figure 7. Coverage/Performance Improvement – Using UE's in PAN system

Figure 8. Coverage/Performance Improvement – UE and PAN based devices

Figure 9. Throughput Improvement – Using UE's in PAN system

Figure 10. Throughput Improvement – UE and PAN based devices

HIGH SPEED DATA AND COVERAGE USING PERSONAL AREA NETWORK

TECHNICAL FIELD

The exemplary and non-limiting embodiments of this invention relate generally to wireless communication systems, devices and terminals and, more specifically, relate to the use of terminals that include a long range transceiver, such as a cellular radio network transceiver, and a shorter range transceiver, such as a Bluetooth™ transceiver, for use in communication within a personal area network (PAN).

BACKGROUND

The following abbreviations that appear below are defined as follows:
2G Second Generation
3G Third Generation
3GPP Third Generation Partnership Project for UMTS
3GPP2 Third Generation Partnership Project for CDMA 2000
AMC Adaptive Modulation and Coding Scheme
BTS Base Transceiver Station
CDMA Code Division Multiple Access
CDR Charge Data Record
DL Down Link
DSRP Dynamic Source Routing Protocol
EGPRS Enhanced General Packet Radio Services
GGSN Gateway GPRS Support Node
GPRS General Packet Radio Service
GSM Global System for Mobile Communications
HSDPA High Speed Downlink Packet Access
HS-PDSCH High Speed Physical Downlink Shared Channel
IMS IP Multimedia Sub-System
IP Internet Protocol
IPSec Internet Protocol Security
MAC Medium Access Control
MAC-hs Medium Access Control—High Speed
MIMO Multiple Input Multiple Output
Node B UMTS Base Transceiver Station Node
OFDMA Orthogonal Frequency Division Multiple Access
OTA Over the Air
PAN Personal Access Network
PDCP Packet Data Convergence Protocol
PDP Packet Data Protocol
PS Packet Switched
PUG PAN User Group
QAM Quadrature Amplitude Modulation
RAB Radio Access Bearer
RDR Route Discovery Request
RLC Radio Link Control
RNC Radio Network Control unit
RP Routing Protocol
Rx Receive
SGSN Serving GPRS Support Node
SIP Session Initiation Protocol
TCP Transaction Control Protocol
TDMA Time Division Multiple Access
Tx Transmit
UE User Equipment
UL Uplink
UMTS Universal Mobile Telecommunication System
UWB Ultra Wide Band
WCDMA Wideband Code Division Multiple Access In current 2G/3G access system solutions such as GSM, EGPRS, UMTS and CDMA each mobile device communicates with the network using protocols and signaling as specified in the various standards such as 3GPP and 3GPP2. The data rates that can be achieved are limited to the specification in the standards and by real world radio environment and network conditions. The future evolution of access technologies use various known methods and techniques to achieve higher gains (e.g., Advanced modulation and coding schemes, MIMO concepts, diversity techniques, antenna beam-forming, 2-way/4-way Rx equalizers and advanced receivers). All of these concepts and techniques may provide gain, but at a certain cost. In some cases the gains cannot be practically realized, for example, it is anticipated that 16 QAM AMC will be used only about 5% of the time in a real world macro environment for HSDPA. Further, although standards specify the use of 15 HS-PDSCH codes, the probability of mobile devices using more than five codes is very low in a macro cell environment. Further, for a MIMO realization the addition of multiple antennas at the mobile device presents significant complexity and other challenges. Also, mobile manufacturers may not implement some of these concepts due at least to commercial reasons. The end result is that even though technology evolves, the real-world usability of the technology will be limited.

SUMMARY

In accordance with an exemplary embodiment of this invention there is provided a method to operate a wireless device that comprises establishing a first connection path with a wireless network using a first long range transceiver; establishing a second connection path with the wireless network via a short range transceiver with at least one other wireless device that uses a second long range transceiver to establish the second connection path to the wireless network, and at least one of transmitting and receiving information using the first long range transceiver and, via the short range transceiver, the second long range transceiver.

Further in accordance with an exemplary embodiment of this invention there is provided a wireless device comprising a control unit having a first interface to first long range transceiver and a second interface to a short range transceiver, said control unit operable to establish a first connection path with a wireless network using said first long range transceiver and to establish a second connection path with the wireless network via said short range transceiver with at least one other wireless device that uses a second long range transceiver to establish the second connection path to the wireless network for at least one of transmitting and receiving information using the first long range transceiver and, via the short range transceiver, the second long range transceiver.

Further in accordance with an exemplary embodiment of this invention there is provided a method, and a computer program product, that includes performance of, with a parent user equipment (UE1), establishing a packet data protocol context and being assigned an IP address by a wireless network element; establishing a wireless network radio access bearer and a data channel; initiating a session between UE1 and a server; scanning for at least one other UE (UE2) in a personal area network of UE1, and establishing communication and negotiating for resources with UE2; sending a PAN User Group (PUG) report containing information for at least identifying UE2; updating a PUG database and communicating a session PUG ID to UE1 and to the wireless network element; sending the PUG ID from UE1 to UE2; creating a PUG routing table at the wireless network element, the PUG routing table comprising IP addresses of PUG group members; in response to the server receiving a PUG-ID response from the wireless network element, sending UE 1 a PUG Reporting Confirm message; and in response to UE1 receiving the PUG Reporting Confirm, instructing UE2 to initiate a session with wireless network comprising reporting at least the PUG ID and IP address to the server.

Further in accordance with an exemplary embodiment of this invention there is provided a wireless network device comprising a first interface to a plurality of wireless equipment and a second interface to an IP server, and further comprising a controller responsive to receiving information indicating identifications of said plurality of wireless equipment for routing packets that are addressed to one of said wireless equipment, in accordance with a routing table that identifies each of said wireless equipment, to each of said wireless equipment.

Further in accordance with an exemplary embodiment of this invention there is provided a wireless device comprising a control unit having a first interface to long range transceiver and a second interface to a short range transceiver, the control unit operable to establish a first connection path with a wireless network using the long range transceiver and to establish a second connection path with an other wireless device via the short range transceiver. The controller is operable to at least one of send and receive packets via the first interface for the other wireless device.

BRIEF DESCRIPTION OF THE DRAWINGS

In the attached Drawing Figures:

FIG. 4 illustrates a network assisted UE based solution—scenario2a.

DETAILED DESCRIPTION

By way of introduction, the exemplary embodiments of this invention are based on creating a unique access system solution by inter-working between existing and possible future mobile access network systems (such as but not limited to GSM, UMTS, CDMA, TDMA, WCDMA, OFDMA based systems) with existing and possible future personal access network systems (such as but not limited to Bluetooth™, a Trademark owned by Bluetooth SIG, Inc., UWB and variants thereof). For example, currently there are many UMTS mobile devices that use Bluetooth as a personal access system for communicating with other mobile devices. The exemplary embodiments of this invention create interworking between UMTS and Bluetooth to enable any mobile device to use the resources of neighboring mobile devices to transmit and receive data with the UMTS network, thereby providing enhanced bitrate/throughput and/or coverage and/or capacity.

Bluetooth™, also referred to herein as BT, has resulted from the National Telecommunications Act opening new public access to the ultra high frequency (UHF) and very high frequency (VHF) bands. As a direct consequence, wireless local area networking is rapidly evolving as the communications standard for small and mobile corporations and other organizations. An important aspect of these new wireless networks is the integration of household (and business office) appliances, laptop computers, and personal communications service (PCS) devices. This technology seamlessly connects each intelligent appliance in a household or an office within a "piconet" (implying a very small) wireless network.

BT is an embedded, low-power, short-range, radio-frequency (RF) technology, although it can also be IR media-based with moderate bandwidth. BT is particularly attractive for exchanging data between personal devices such as cellular phones, radios, pagers, personal digital assistants, notebook computers, video and still cameras, audio players, and local area networks (LANs).

With an operating range of 10 meters or less, the reach of BT exceeds the current range of IR, but falls far short of other types of wireless networks. BT is implemented at 2.4 GHz in the Industrial, Scientific, and Medical (ISM) band.

The exemplary embodiments of this invention provide a unique and realizable solution that address the problems described previously, and are capable of providing similar gains in terms of high speed user data and improved coverage/performance, but with lower complexity and lower cost.

The exemplary embodiments of this invention provide a unique access system to solve the problems described above by the use of an innovative method of inter-working between mobile network access systems and personal access systems to transmit and receive data simultaneously using multiple mobile devices in the vicinity. The use of the exemplary embodiments of this invention creates a mobile ad-hoc network using the personal access system, and uses inter-working between the personal access system and mobile network access system to transmit and receive data simultaneously. For example, assume that a mobile device (referred to below as a "parent" mobile device) is to transmit or receive data. In this case it first scans mobile devices available in the (local) personal access system and establishes communication. This means that other mobile device resources in the vicinity are used to transmit and receive data, and any data combining is done at the parent mobile device. Due to the multiple transmitters and receivers involved a higher gain in bit rate, coverage and capacity is achieved. It can be noted that the use of the exemplary embodiments of this invention do not necessarily require an evolution of access technologies, as existing technologies and access systems are employed to achieve higher gains through unique inter-working methods.

In a real world mobile environment the probability of having a minimum of one other mobile device in the near vicinity is very high, almost 100%, and the exemplary embodiments of this invention exploit this to create a unique access system to achieve higher gains in data rate, coverage and performance. For example, when a user is at home, in the workplace, in-vehicle, in a restaurant or shopping mall, as a few non-limiting examples, the probability of having a nearby mobile device or similar device with PAN capability is very high. Each mobile device scans using its personal access system to find other mobile devices in near vicinity and then establishes communication and uses the resources of the neighboring mobile device(s) to transmit and receive data to achieve higher bit rate/throughput and/or capacity and/or coverage. Due to physical separation of the antennas of the different mobile devices diversity can be achieved in transmission and reception between each of the mobile devices and the mobile wireless network access system. The data between the different mobile devices is communicated using the personal access system and the combining is done at the parent mobile device on the downlink. As employed herein the parent mobile device is the mobile device that makes or receives a data/voice call and uses resources from other mobile devices to achieve higher bit rate and/or coverage and/or capacity).

As the exemplary embodiments of this invention are based on the mobile device, also referred to as a UE, the participation of different mobile devices and/or other devices may be entirely controlled by individual user acceptance and/or may be network operator defined and controlled.

The implementation details and examples of the presently preferred embodiments of this invention are described below in the context of two scenarios. Although the exemplary embodiments of this invention can use many access technologies and systems, the UMTS system is used for convenience as a non-limiting example.

Scenario 1—Mobile PAN Based Tx and Rx Diversity Access System

Diversity refers to a technique that utilizes two or more copies of a signal with varying degrees of disturbances (e.g., via independent paths) to achieve, by some selection or combining scheme, a consistently higher signal to noise ratio than is achievable from any one of the individual copies of the signal separately. A typical approach may use multiple antennas at a transmitter or receiver and combining signals from all branches using different weights thereby improving the signal to noise ratio (SNR). However, in practical environments it is typically the case that size, cost and power constraints make it a complex task to add antennas at the UE.

In accordance with the exemplary embodiments of this invention existing neighboring UE resources are used, and by including additional antenna(s) in a PAN there is achieved a true Tx and Rx spatial diversity. Time diversity may be added as well by varying the transmission times from the various cellular network antennas of the UEs.

In accordance with the exemplary embodiments of this invention a UE establishes a communication link via a PAN, such as through use of, as non-limiting examples, Bluetooth™, UWB and variants thereof, between UEs and/or other devices, thereby combining data packets received from all involved antennas at the parent UE.

Figure 1:
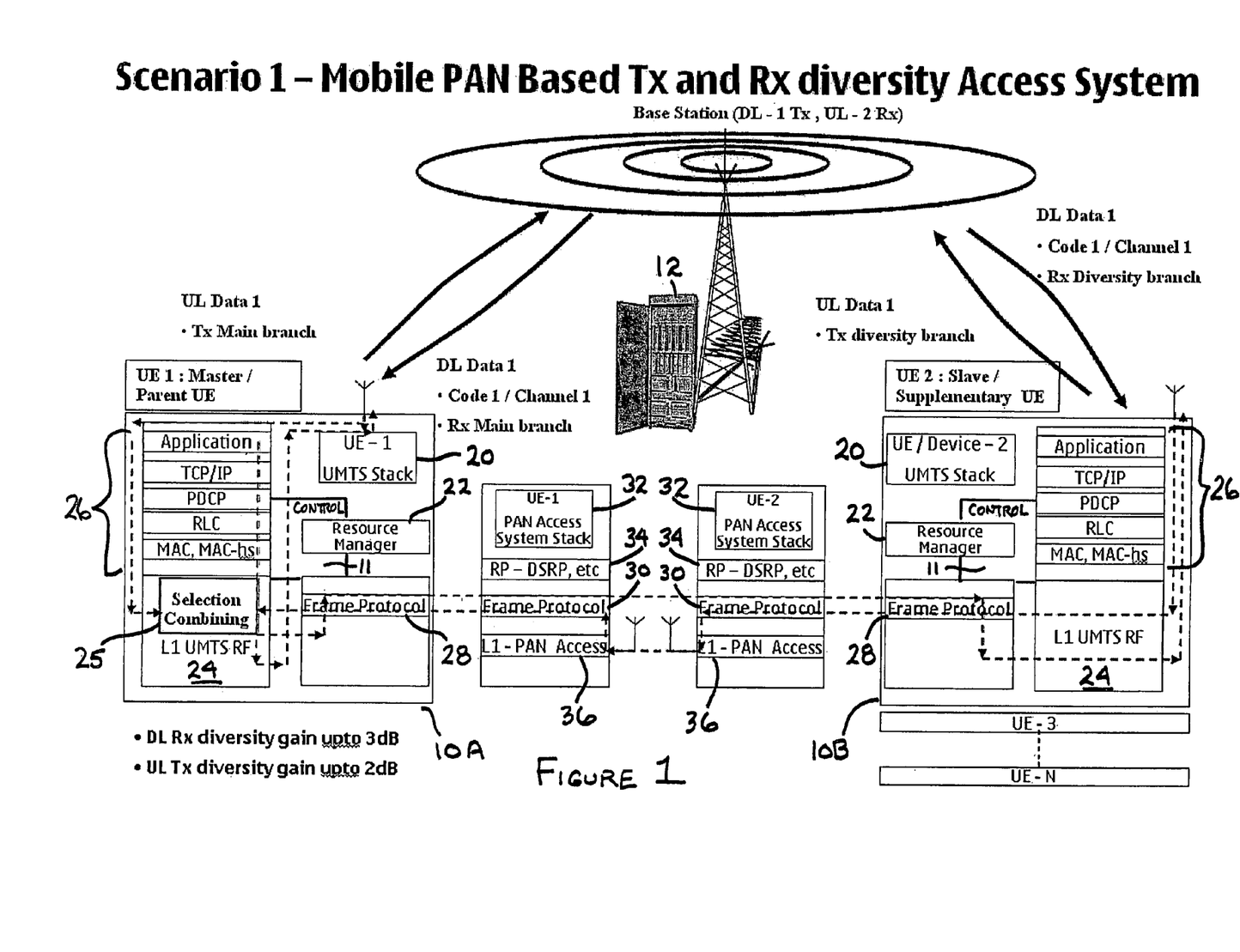
FIG. 1 illustrates a mobile PAN based Tx and Rx Diversity Access System.

Referring now to FIG. 1, there is shown a first UE 10A (UE 1, also referred to herein as the master UE, or as the parent UE, or as a primary UE) and a second UE 10B (UE 2, also referred to herein as a slave UE, or as a supplementary UE). A cellular network base station 12 is also shown. For this non-limiting example each UE 10 is assumed to include an UMTS protocol stack 20, a resource manager 22 and a L1 UMTS RF block 24 coupled to at least one cellular system antenna. Each UE 10 may also include, as one non-limiting example, a protocol stack 26 containing, as a non-limiting example, an Application layer, a TCP/IP layer, a PDCP layer, a RLC layer and a MAC, MAC-hs layer. A frame protocol block 28 is coupled between the L1 UMTS RF block 24 and an associated PAN frame protocol block 30 and PAN access system stack 32 that includes, as a non-limiting example, an RP-DSRP layer 34, the PAN frame protocol block 30, and a L1 PAN access block 36 coupled to a PAN antenna. There may be additional UEs, such as UEs-3 . . . n.

Figure 3:
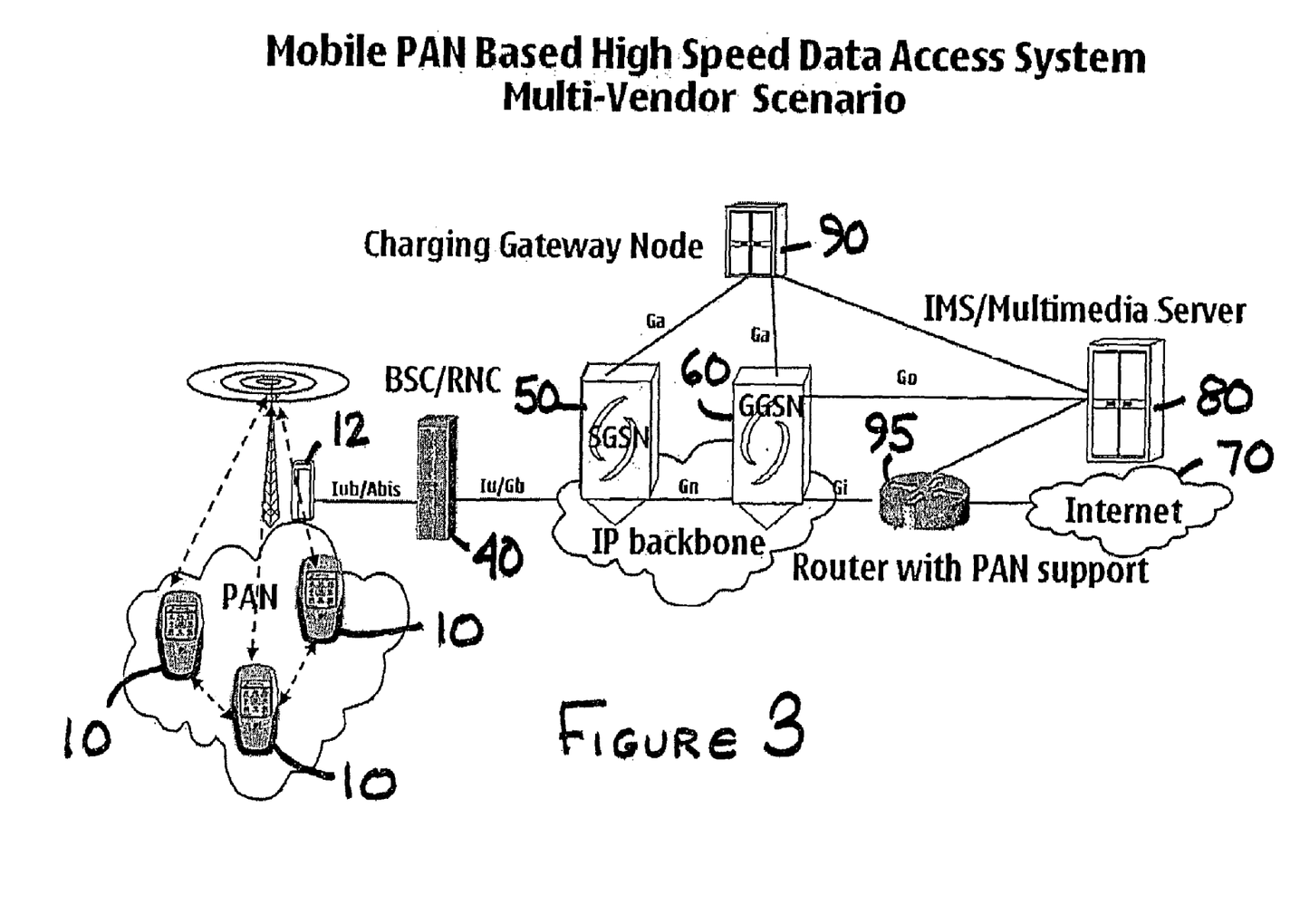
FIG. 3 illustrates a multi-vendor scenario for mobile PAN-based High Speed Data Access System.

For this non-limiting example each UE 10 is further assumed to include a control unit or device 11, such as one or more programmed data processors, that are operable with the various protocol stacks and other features shown in FIG. 1 to implement the exemplary embodiments of this invention. The control unit 11 is assumed to include interfaces to long range (e.g., cellular, having a range of hundreds or thousands of meters) and short range (e.g., Bluetooth™, having a range of meters, such as ten meters) wireless transceivers. A similar UE control unit 11 is assumed to be present in the other Figures as well. In addition, the various network components (e.g., the GGSN 60 and IMS/Multimedia Server 80 shown in FIG. 3 and other Figures) are also assumed to include suitable data processors for implementing the exemplary embodiments of this invention. In all of these cases the operable computer program instructions are assumed to be stored on or in suitable data storage medium, such as semiconductor memory and/or magnetic disk, and to be readable by the associated data processors for directing their operations when implementing the exemplary embodiments of this invention.

In operation, and based on current 2G and 3G systems, the UE 1 establishes a communication channel with the BS 12 as per defined specifications in standards (e.g., as in 3GPP, 3GPP2). This is assumed to occur via a long range transceiver, such as the cellular system RF transceiver of the UE 1. After the parent UE 1 establishes communication with the BS 12, it scans for neighboring UEs within the PAN. This is assumed to occur via a short range RF (or optical) transceiver, such as a Bluetooth™ transceiver. The parent UE 1 then negotiates for resources with the neighboring UEs with the aid of the radio resource manager 22. The radio resource manager 22 includes the functionality of requesting, establishing, managing and terminating the required resources. The resource manager 22 may be an application designed for this purpose or it may be a modification of an existing resource manager application in the UE 10 (or some other device similarly constructed). The resource manager 22 may also provide a user-interface (UI) for administration-related tasks, such as user acceptance and configuration tasks, which may be done manually or via OTA programming. During the process of establishing the resources with other UEs the resource manager 22 also passes on the information of the code/channel that the slave UE 10B should use to decode the downlink from the BS 12.

After the neighboring UE 2 decodes the Layer1 frame for the parent UE 1, the frame protocol block 28 acts as a bridge between the UE 2G/3G protocol stack 26 and the PAN protocol stack 32 within the UE 1. The bridge may be established between the Layer1 stacks on both sides of the wireless interface.

The transmission and reception of data packets between the parent UE 1 and the neighboring slave UE 2 may be operated independently by the PAN stack 32 and PAN-related technology. As can thus be appreciated, the operation is independent of the underlying PAN access technology or protocols. Once the parent UE 1 receives the Layer1 frames transmitted by the neighboring slave UE 2 on its PAN stack, the frame protocol block 28 converts the frames back into 2G/3G Layer1 protocol frames. A Layer1 combining block 25, such as one based on selection combining, may be implemented in the parent UE 1 to take advantage of the receive space diversity on the downlink.

Selection combining block 25 may operate via process where two identically transmitted frames are received on two different paths that are assumed to be non-correlated, and the best received frame, or frame with the best quality, is selected. Advantage is taken based on the fact that the two paths are assumed to be non-correlated, or at least substantially non-correlated, and therefore the frames will have less probability of degrading simultaneously. In other embodiments the combining process may be based on TCP level ordering of received packets, as described below. It is also within the scope of the exemplary embodiments of this invention to employ, as another non-limiting embodiment, an application level ordering of received packets.

On the uplink the parent UE 1 passes frames to be transmitted to the neighboring slave UE 2 and thus TX diversity may be achieved as well for the parent UE 1. The parent UE 1 passes the Layer1 2G/3G frames to the neighboring slave UE 2 on the PAN using the PAN frame protocol block 30. As a part of the radio resource establishment the parent UE 1 also passes information regarding the UL channel, scrambling code and relevant information to be used by the neighboring slave UE 2 to transmit the UL frames from the parent UE 1. Based on this information the neighboring slave UE 2 directly modulates and transmits the Layer1 UMTS frames received on its PAN stack 32 from parent UE 1.

It should be noted that, for both the transmit and receive paths, space-time coding may be used for realizing an improved gain.

Scenario 2—Mobile PAN Based High Speed Data Access System

This approach offers a capability to achieve higher speed data rates as compared to current 2G/3G systems. This approach is less complex to implement than a MIMO approach, and other approaches presently proposed as part of 3G evolutions to 3.9/4G.

The mobile PAN-based high speed data access system combines the use of neighboring UE resources within the PAN system to achieve the increased data rate, and may be applied to any existing or future technology/access system to achieve increased data rates, while being fully backward compatible to existing/current systems. The mobile PAN-based high speed data access system is also applicable to those UEs having capability limited to only certain data rates.

As a non-limiting example, there are at least two possible embodiments of the mobile PAN-based high speed data access system presented here. The first is a network-assisted UE-based embodiment, where the UE plays the major role and the network facilitates the communication. The second embodiment is UE-based, where the parent UE is responsible for establishing all communication for all mobile devices in the PAN to achieve a high-speed data rate for itself.

In the latter UE-based embodiment the parent UE instructs the network GGSN/Router to establish multiple data routes on the downlink. This can be achieved through the use of DSRP, wherein the parent UE sends a RDR with destination as the GGSN routing address, and where a neighboring UE(s) sends the route discovery response. This embodiment assumes the presence of a data pipe (RAB+Core) that is already established by all UEs involved in the data transfer. Relatively small changes/feature support are made in the GGSN to support this embodiment. For example, the GGSN can create a PUG routing table based on the RDR and RDR responses from UEs within its domain. In this way the GGSN can route incoming packet data flow across the multiple static routes created based on the PUG routing table, and also generate CDRs.

DSRP is known to be a simple and efficient routing protocol designed specifically for use in multi-hop wireless ad hoc networks of mobile nodes. DSRP allows the network to be completely self-organizing and self-configuring, without the need for any existing network infrastructure or administration. DSRP can interoperate with Mobile IP, and nodes using Mobile IP and DSRP have seamlessly migrated between WLANs, cellular data services, and DSR mobile ad hoc networks.

The protocol is composed of the two main mechanisms of "Route Discovery" and "Route Maintenance", which work together to allow nodes to discover and maintain routes to arbitrary destinations in the ad hoc network. All aspects of the protocol operate entirely on-demand, allowing the routing packet overhead of DSRP to scale automatically to only that needed to react to changes in the routes currently in use.

The protocol allows multiple routes to any destination and allows each sender to select and control the routes used in routing its packets, for example for use in load balancing or for increased robustness. Other advantages of the DSRP protocol include easily guaranteed loop-free routing, support for use in networks containing unidirectional links, use of only "soft state" in routing, and very rapid recovery when routes in the network change.

DSRP is officially defined by an Internet-Draft. Reference may be had to "The Dynamic Source Routing Protocol for Mobile Ad Hoc Networks (DSR)", Johnson, Maltz, Hu, 19 Jul. 2004.

A more detailed description of the exemplary embodiment described above is now provided with reference to FIG. 2, where those elements found also in FIG. 1 are numbered accordingly.

Figure 2:
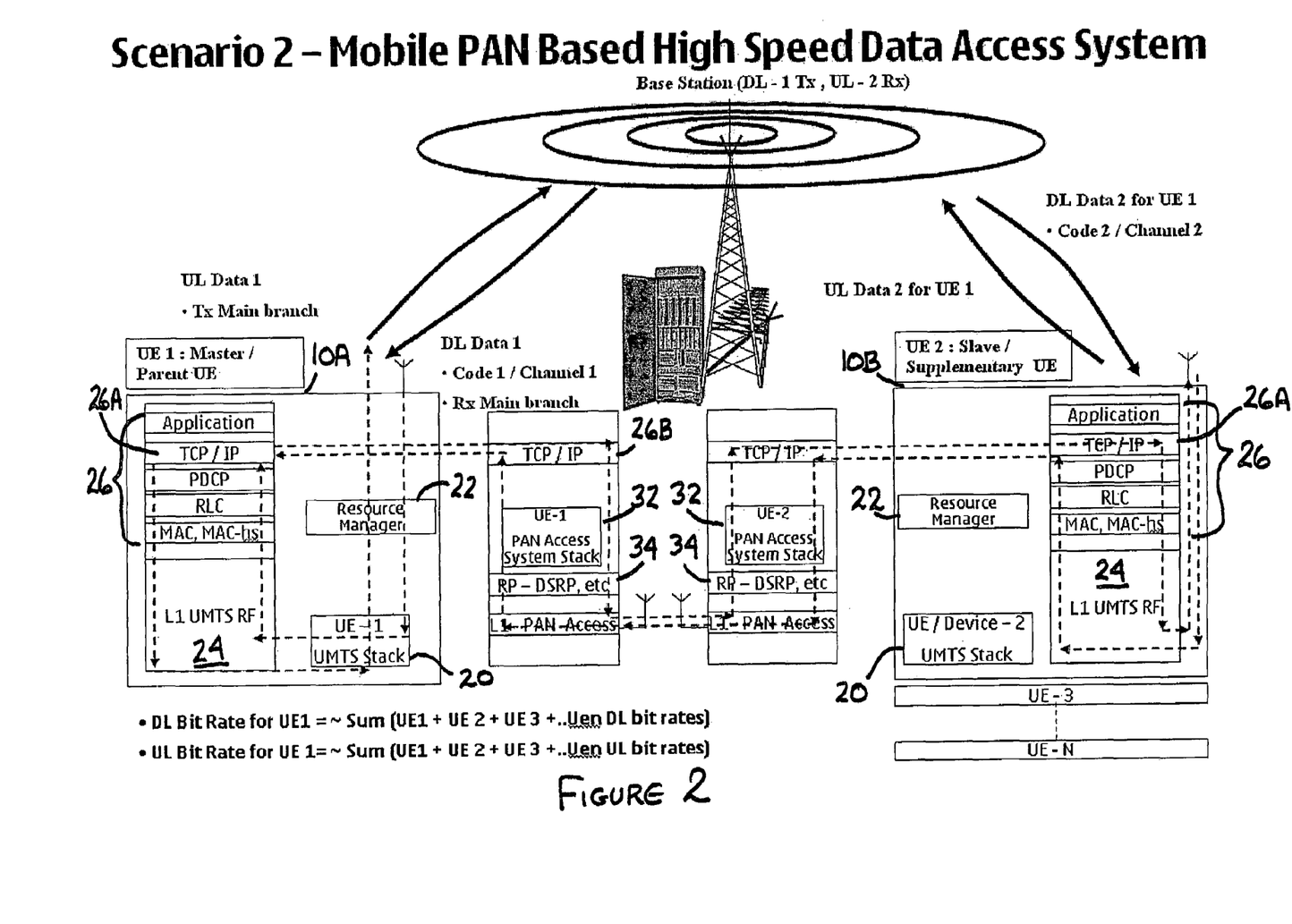
FIG. 2 illustrates a mobile PAN-based High Speed Data Access System.

In this embodiment the UE 10 has full authority and flexibility to request, establish, maintain and release communications with neighboring UEs within the PAN system. The network is substantially transparent in this embodiment, which is well suited for future networks wherein the base station 12 can be directly connected to the internet, and where network entities such as the RNC, SGSN and MSC may not be present (except possibly for a media server or similar entity for serving the users).

This exemplary embodiment of the invention achieves its objectives by making use of an application, that may be referred to as PAN, which may reside on any of the existing network elements such as the GGSN/IMS/Media server. The overall functionality of the PAN application is generally to establish, route and terminate data transfers between users actively connected in a PAN network. The PAN application may also additionally perform the functionality of facilitating the correct generation of CDRs by the GGSN/Router for users in the PAN group for billing purposes.

This embodiment may be viewed as an application/IP layer-based approach that offers full backward compatibility to existing 2G/3G systems and possible future cellular network systems. The multiple data transmission and reception paths between the master UE (UE1) and the neighboring slave UEs (UE2 . . . UEn) is established on a three-step approach:

1) Establishment of communication and resource negotiation between UE1 and neighboring UE2 . . . UEn;
2) Establishment of a physical data pipe (RAB+Core) for each of the UEs; and
3) Data transfer and routing of the incoming packet data flow through the physical data pipes to UE1. In this case the UE2 . . . UEn are used as routers. In addition, SIP-based application signaling is used to establish virtual connections for data flow through UE2 . . . UEn for UE1.

On the DL the GGSN, or similar routers that support the PAN application, performs the function of establishing static routes with the UE1 through UE2 . . . UEn and distributing (e.g., equally) packets across these routes.

On the UL the UE1 performs the function of traffic distribution, such as equal distribution, for the outgoing packet data flow across established data pipes through UE2 ... UEn In this case UE1, UE2 ... UEn all function as routers with UE1 being the source and the parent router. The combining and sequencing of the packets is handled by the TCP protocol layers 26A, 26B, which is facilitated since packets on all these routes through UE1, UE2 ... UEn are all directed to the same destination IP address.

FIG. 2 shows the data flow on the UL and the DL across the protocol stack in the UE, which includes both the PAN protocol stack and the 2G/3G access technology protocol stack. It is clearly seen from the FIG. 2 that the data rate of the parent UE can be increased approximately by the number of neighboring UEs participating in the PAN. Described now in further detail is the network-assisted UE-based approach in light of three exemplary and non-limiting embodiments thereof.

Figure 4:
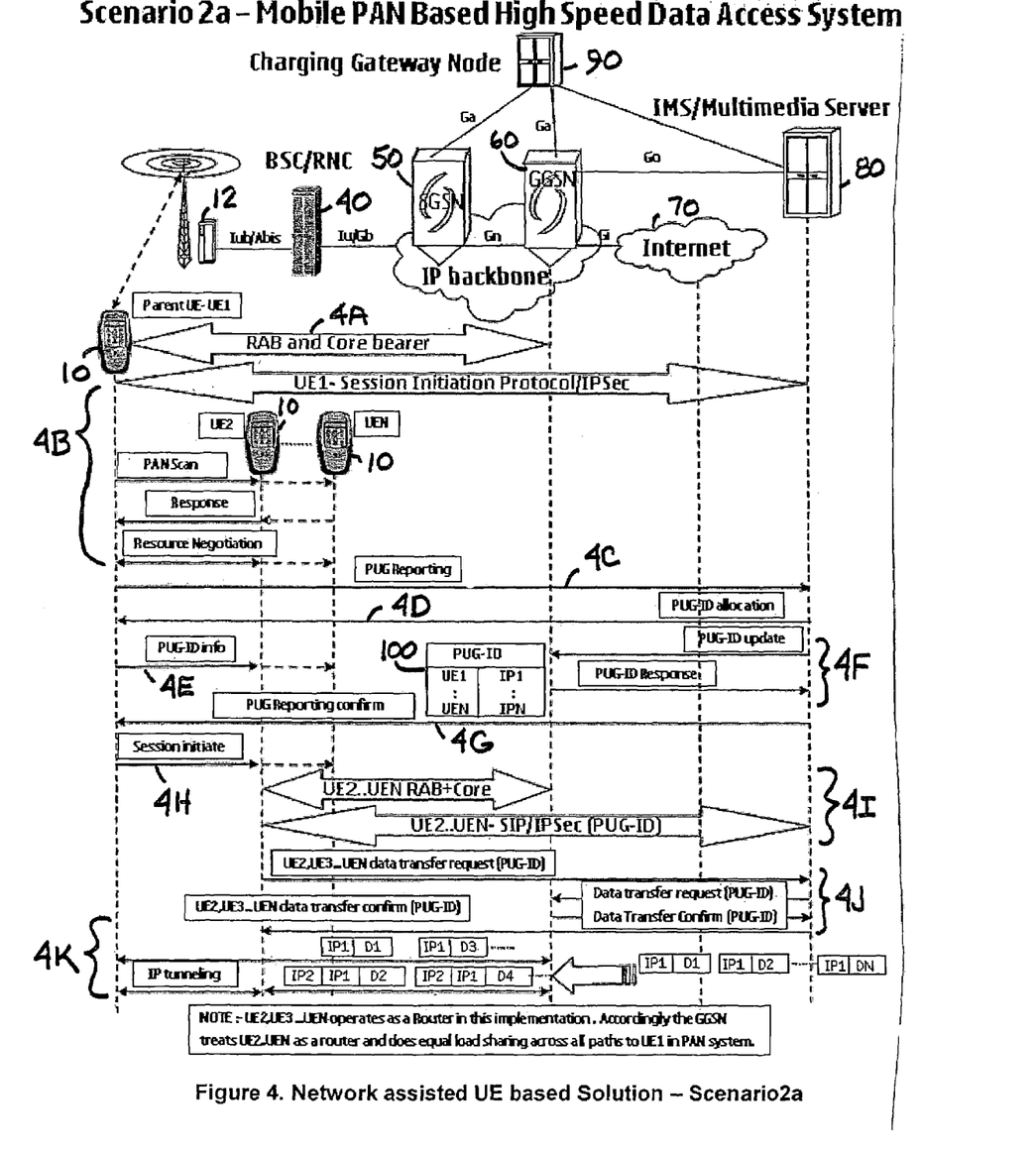

The first exemplary embodiment is described with reference to the message flow diagram of FIG. 4. In FIG. 4 are illustrated several UEs 10 and in the network, a BSC/RNC 40, SGSN 50 and GGSN 60 at the IP backbone and connecting to the internet 70, an IMS/Multimedia server 80 and a charging gateway node 90. The various interfaces (Iub/Abis, Iu/Gb, Gn, Gi, Go and Ga) between these network elements are also shown. In this embodiment full backward compatibility is supported and therefore it is assumed that the UE 10 establishes communication channels as per defined standard and specifications of current 2G and 3G systems (e.g., 3GPP, 3GPP2). Based on the signaling diagram of FIG. 4 the following operations are performed.

4A) The parent UE (UE1) first establishes the PDP context and is assigned an IP address by the GGSN 60 (UE1-IP1). Following this procedure the RAB/Data Channel/Data pipe is established as per the current 2G/3G specifications.

4B) Next, when the UE1 initiates a SIP session with the IMS/Media server 80, it also scans for neighboring UEs using its PAN, establishes communication and negotiates for resources with the neighboring UEs on the PAN (UE2 ... UEn).

General reference with regard to SIP can be made to RFC 3261, "SIP: Session Initiation Protocol", J. Rosenberg et al., June 2002.

After identifying the neighboring UEs (UE2 ... UEn), the parent UE1 informs the IMS server 80 of the identified UEs in a list sent on the SIP connection in a 'PAN reporting message' (4C). This report may be referred to as a PUG (PAN User Group) report. The PAN user group report is composed of UE IDs (e.g., MSISDN) and negotiated resources (e.g., RAB bit rates).

The IMS server 80 updates its PUG database and allocates a PUG ID for the session, which is communicated back to UE1 and GGSN 60 (4D).

The UE1 then passes the PUG ID to all neighboring UEs (UE2 ... UEn) within the PAN (4E). The GGSN 60 creates a PUG routing table 100 and updates the table with the IP addresses of the PUG group members (4F). Additional information may be added to the PUG routing table 100, such as PDP context numbers, the MSISDN and the IP address. The GGSN 60 uses the PUG routing table 100 to define static paths for packet data flow to the UE1 and may employ mechanisms, such as equal load sharing, to distribute the incoming packet flow across the defined static paths. This implies that the GGSN 60 treats as routers all of the UEs, except for the parent UE1, in the PUG routing table 100.

Once the IMS server 80 receives the PUG-ID response from the GGSN 60 it sends confirmation to the UE1 with a 'PUG reporting confirm' message (4G). The UE1 then informs the neighboring UEs (UE2 ... UEn) to initiate their sessions (4H). Following receipt of this message the UE2 ... UEn establish RAB+Core bearer and SIP signaling sessions with IMS server 80 (4I). As part of SIP signaling messages the UE2 ... UEn report the PUG-ID, along with other information such as the IP address, MSISDN and PDP context number, to the IMS server 80. This information is further passed to GGSN to update the PUG routing table 100. Upon receiving the data transfer request from UE2 ... UEn the IMS server 80 sends back a confirmation message after any desired communication with GGSN 60 (4J).

At this point the GGSN 60 begins performing equal load sharing for the incoming data flow in the DL, across the static routes defined as per the PUG routing table 100, and in this manner the UE1 achieves multiple routes of data transmission capability (UE1+UE2+. . . UEn), thereby obtaining higher data rates and throughputs (4K). Note that IP tunneling may be used between UE1 and the neighboring UEs (UE2 ... UEn) to pass the IP packets to UE1.

The aspect of billing may also be the responsibility of the GGSN 60 by referring to the PUG routing table 100. Here the CDRs generated by UE2, ... UEn are all dynamically mapped to the UE1-ID based on the PUG routing table 100. This is due to the fact that UE1 is the parent data user and all the other UEs in the PAN are merely used as routers to route packets to UE1. In other words, UE2 ... UEn are used only as resources to increase data rates by establishing multiple channels for UE1.

Note that the users within the PAN group may change, and also the parent user UE1 may move from one network to another network. To handle any possible mobility management issues that may arise the UE1 sends an updated PUG report whenever there is a change in the neighbor list within the PAN and the negotiated resources. This aids the GGSN 60 in dynamically adjusting the PUG routing table 100, and the defined static routes, to adjust with PAN conditions. In case of a RAB failure with any of the UEs the connections and data flow may be released as per existing defined standards for 2G and 3G systems.

The uplink may function as per the description given above with reference to FIG. 2 (Scenario2).

Scenario 2b is explained below with reference to FIG. 5. Scenario 2b is similar to scenario 2a in many aspects except for the fact that UE1 performs all of the SIP signaling and communication with the IMS server 80 to establish the session, and UE2 ... UEn function simply to establish the data pipe (RAB+core). Note that steps 5A-5H can conform to the steps 4A-4H in the embodiment of FIG. 4. At 5I the UE2 ... UEn establish the data pipe with GGSN 60 and inform the UE1 of the data pipe ID (PDP context) at step 5J. Following this the UE1 passes the information(PUG ID and PDP context number for UE2 ... UEn) to the IMS server 80 (5K), which further passes this information to the GGSN 60 as a part of the data transfer request (5L). The GGSN 60 then initiates load sharing of the incoming packet data flow along the static routes defined based on the PUG routing table 100 (5M).

Figure 5:
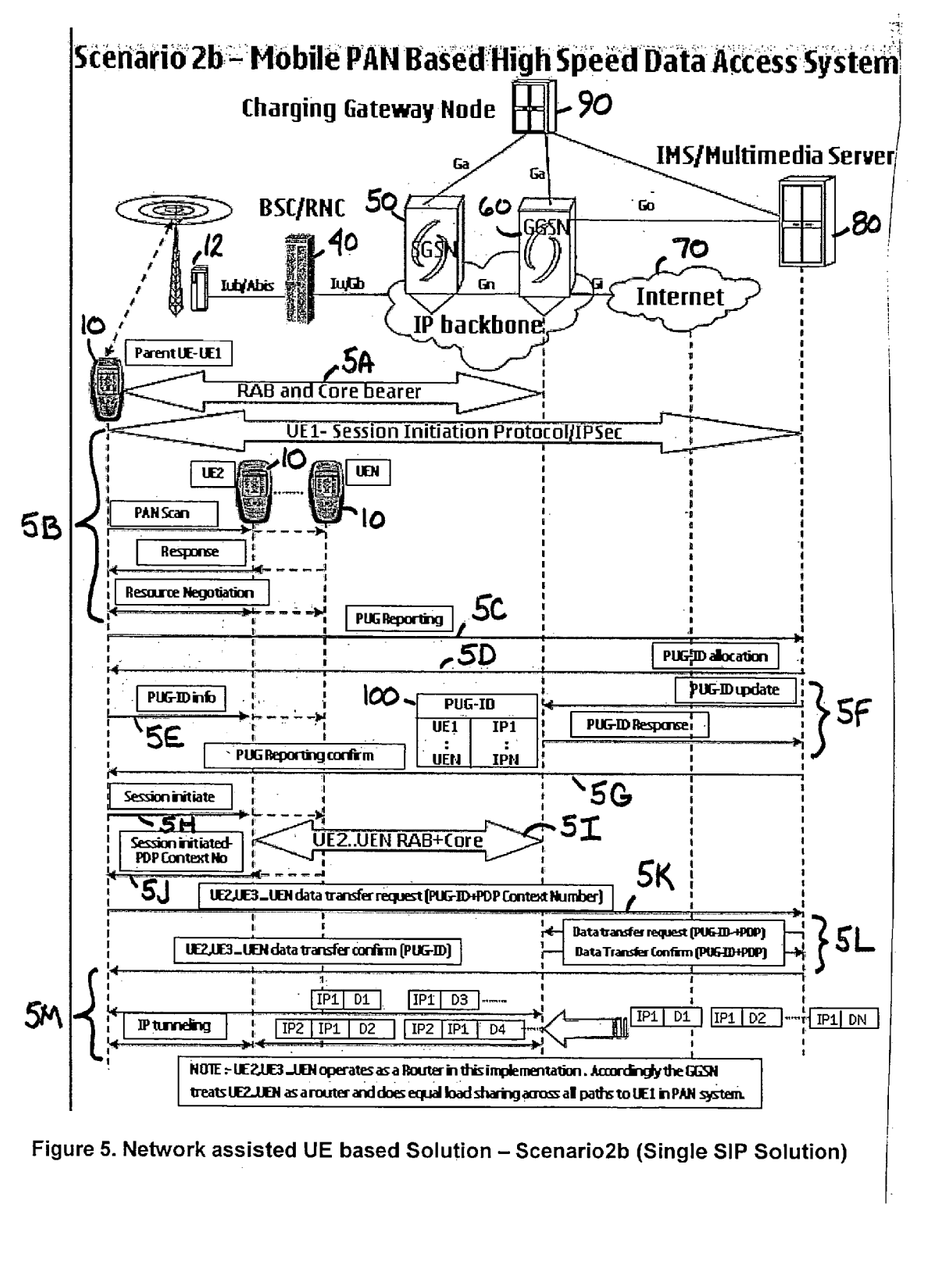
FIG. 5 illustrates a network assisted UE based solution—scenario2b (Single SIP Solution).

One advantage of the use of the embodiment of FIG. 5 is that there is no SIP signaling or communication required by or expected from UE2 ... UEn with the IMS server 80, as they need only establish the data pipe and then function as routing agents.

Figure 6:
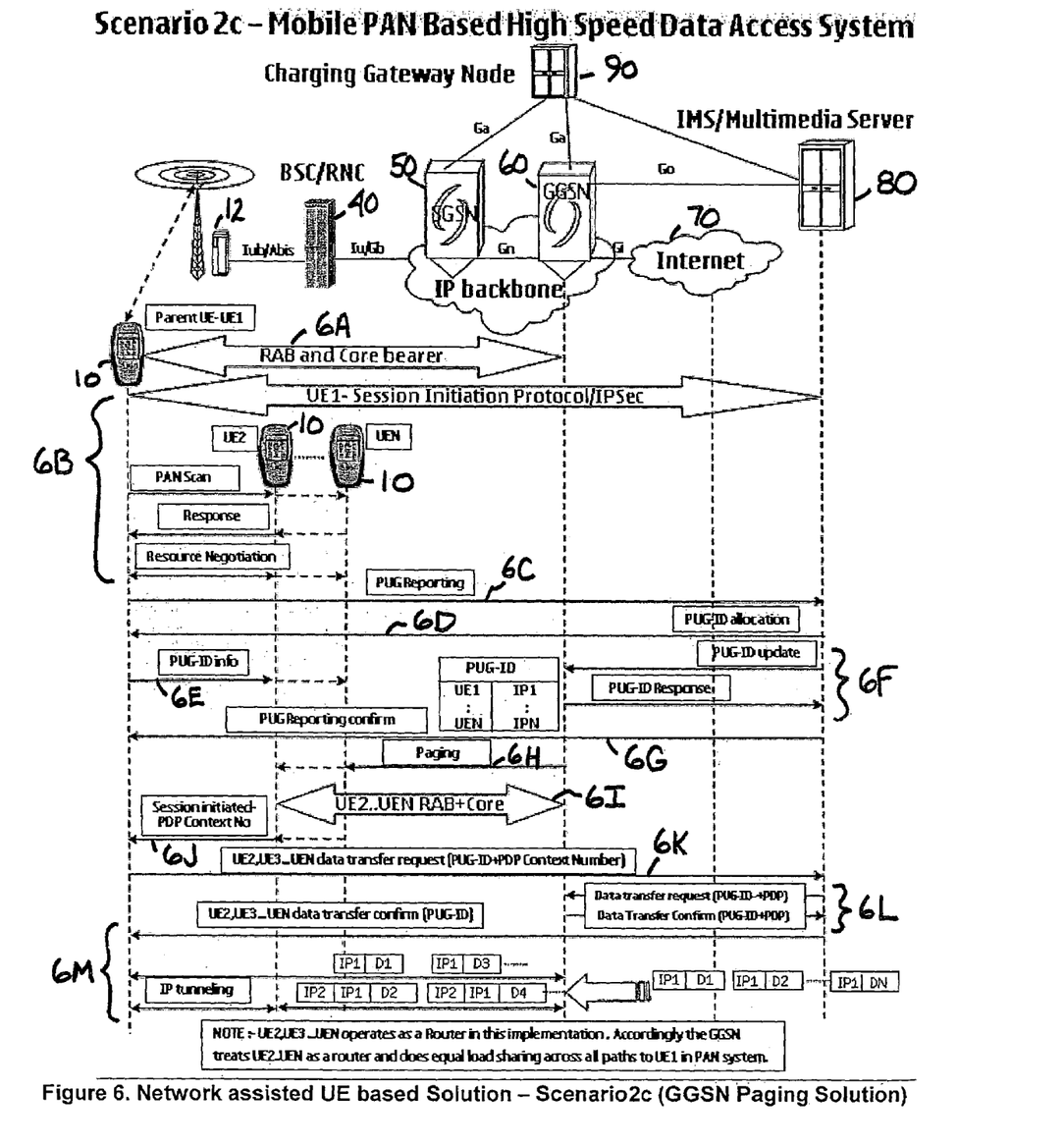
FIG. 6 illustrates a network assisted UE based solution—scenario2c (GGSN Paging Solution).

Scenario 2c is explained below with reference to FIG. 6, which discloses Steps, 6B, 6D, 6F, 6E, and 6G. Scenario 2c is also similar to Scenario 2a in many aspects, and differs primarily in that the data pipe for the UE2 ... UEn is established as a mobile device-terminated PS data call. Here the GGSN 60 initiates the data pipe setup for UE2 ... UEn by sending a paging command on the DL (step 6H). Following the receipt of this paging message the UE2 . . . UEn establish the data pipe (6I) and then inform UE1 of the data pipe ID (PDP Context ID) at step 6J. The UE1 passes the data pipe ID information to the IMS 80 at step 6K, which further passes this information to the GGSN 60 as a part of the 'data transfer request' (6L). The GGSN 60 then initiates load sharing of the incoming packet data flow along the static routes defined based on the PUG routing table 100 (6M). Thus, steps 6B, 6D, 6F, 6E, and 6G correspond to steps 4B, 4D, 4F, 4E, and 4G of FIG. 4.

One advantage that can be realized by the use of this embodiment of the invention is that, as in the second embodiment (Scenario 2b), there is no SIP signaling or communication required by or expected from UE2 . . . UEn with the IMS server 80, as they merely establish the data pipe and act as routing agents. In this case the core network initiates the data pipe establishment at step 6H.

It can be noted that in the case of a multi-vendor environment (see FIG. 3) this embodiment can be deployed on the Gi interface through the use of a router (with PAN application support) 95 and the IMS/Media/Application server 80 connected to the GGSN 60, possibly provided by other vendors. In this case the router 95 is connected to the Internet 70.

It can be noted with regard to the first scenario discussed above (Tx/Rx Diversity) that the UE2 . . . UEn can use the same code assigned to UE1 on uplink and downlink. On the DL this corresponds to pure Rx diversity and on the UL this corresponds to pure Tx diversity. Note further that since in the UL the same code is being used by UE2 . . . UEn, space-time coding may be introduced for the data transmitted from UE2 . . . UEn as compared to UE 1. The base station on the UL may then take advantage of the multiple signal paths which are space-time coded to realize the gain.

For second scenario discussed above (High Speed Data Rate) the UE2 . . . UEn will typically use different codes on the UL and DL as per current 2G/3G, or possible future standards. Since UE2 . . . UEn are establishing connections the to cellular network as per current 2G/3G (or possible future) standards, the codes allocated to Transmit/Receive on the UL and DL will be different, as per current 2G/3G standards, and will be different as compared to codes assigned to UE1.

Various non-limiting implementation examples are now provided. The first is explained with reference to FIGS. 7 and 8, where it can be observed how both coverage and performance improvements are achieved using the Mobile PAN-based TX and RX diversity access systems. In the FIG. 7 it can be observed that the neighboring UEs within the PAN may be used as transmit antennas for the UE1, and thus achieve TX diversity on the UL. Likewise in the DL receiver diversity is achieved by efficiently combining packets (e.g., by the use of the selection combining block 25) at UE1. This is useful, as it is known that TX and RX diversity schemes combined with space-time coding can aid in achieving performance improvements. Reference in this regard maybe made to Almouti, S. M., A Simple Transmitter Diversity Scheme for Wireless Communications, IEEE J. Sel. Ar. Comm. 16 (8): 1451-1458, October 1998, and Bertand, H., Thomas, L. M., Constatinos, B. P., A Transmitter Diversity Scheme for WideBand CDMA systems based on Space-Time Spreading, IEEE Journal, Vol 19, January 2001.

Figure 8:
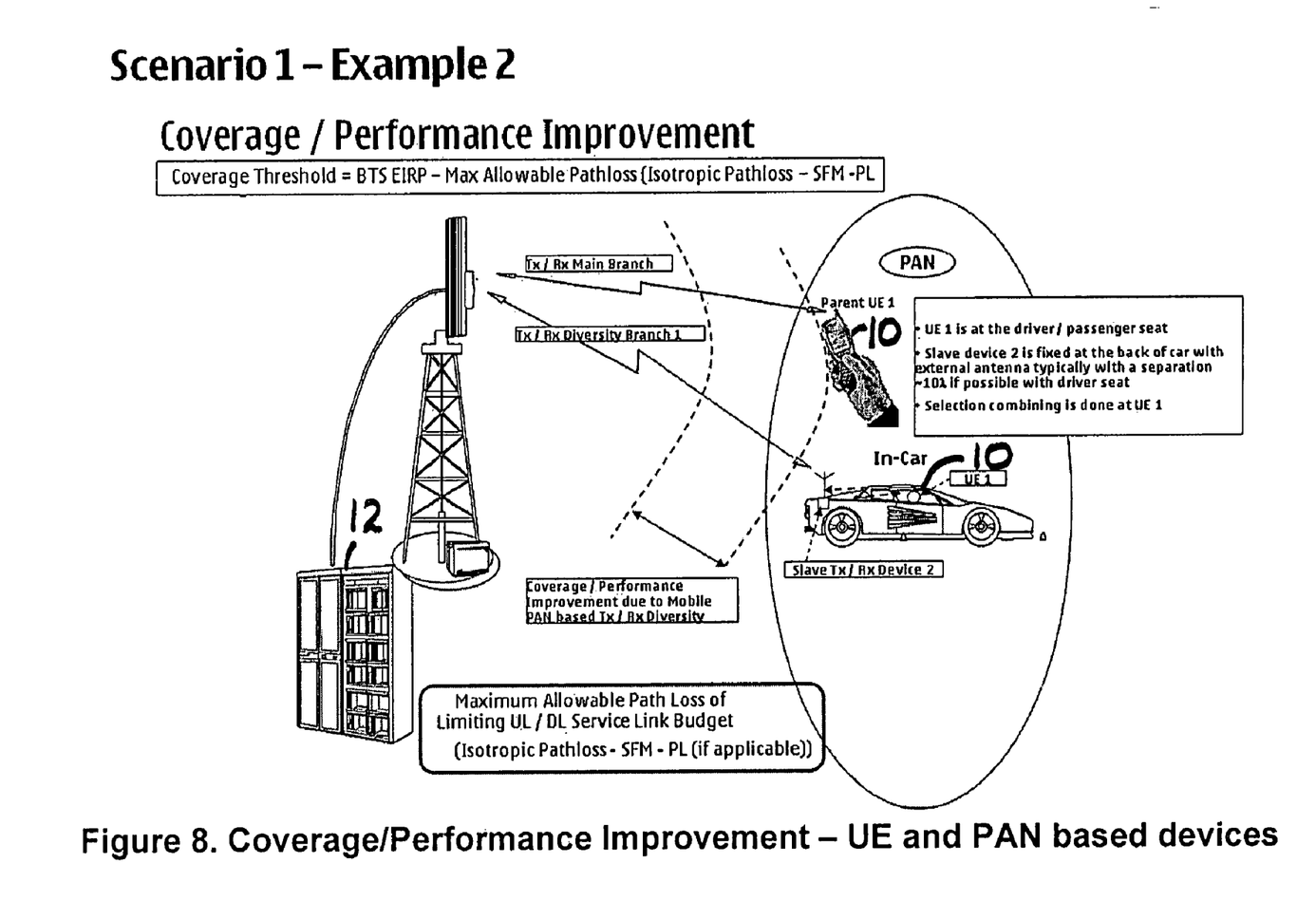
FIG. 8 illustrates a coverage/performance improvement for UE and PAN-based devices.

Likewise in FIG. 8 it is shown that RX and TX diversity can be achieved in a PAN system using UE and PAN-compatible devices that can also act as transceivers and communicate with existing 2G/3G technologies. Such devices can be low cost performance enhancement devices and may not be provisioned with a user interface, such as a data input device and a display device. The following example shows how RX and TX diversity is achieved using UE and PAN-compatible device equipped in a vehicle having an external antenna. This can also provide higher gain since the in-car penetration loss does not apply to the PAN device with the external (to the vehicle) antenna.

Figure 7:
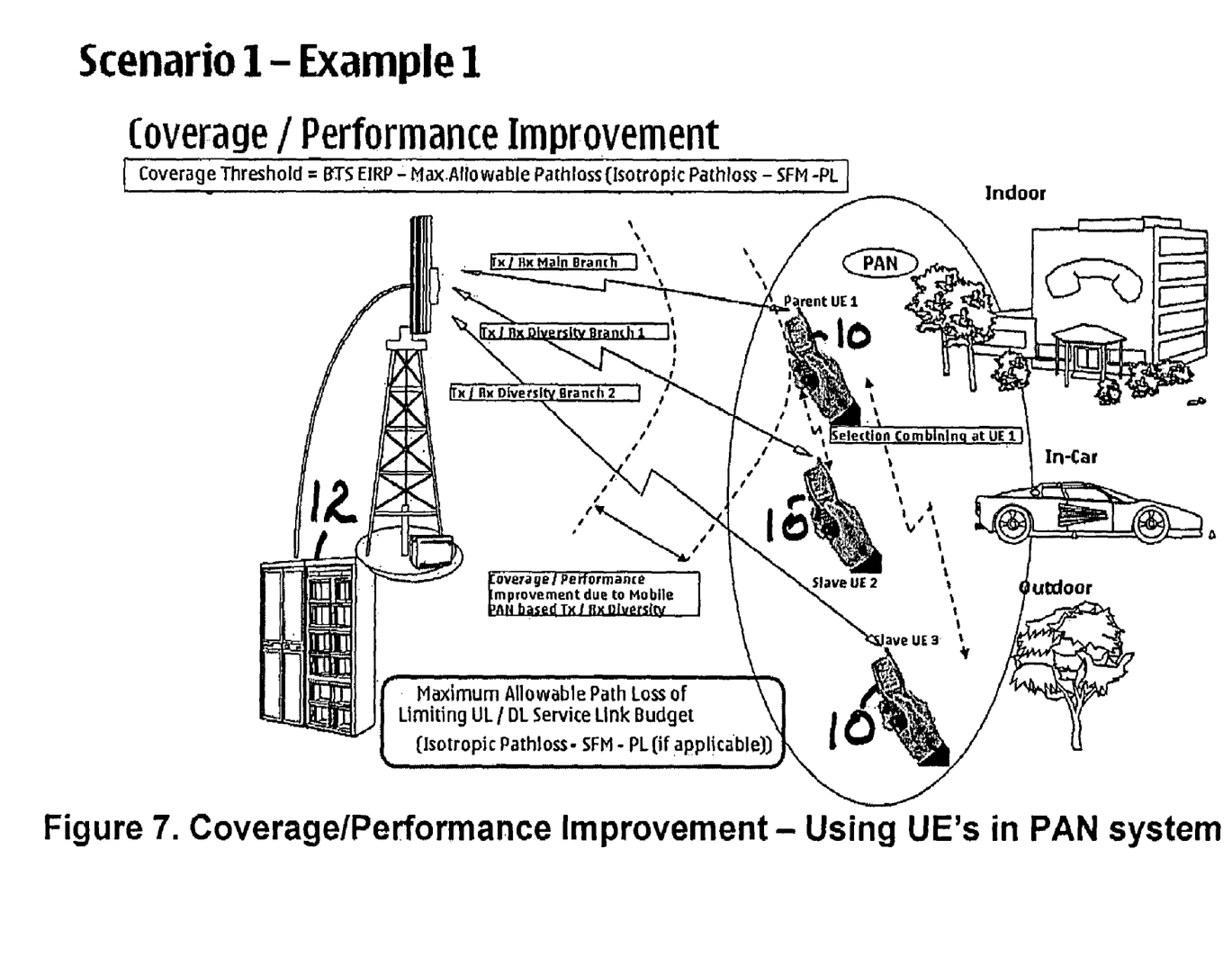
FIG. 7 illustrates a coverage/performance improvement using UEs in a PAN system.
Figure 9:
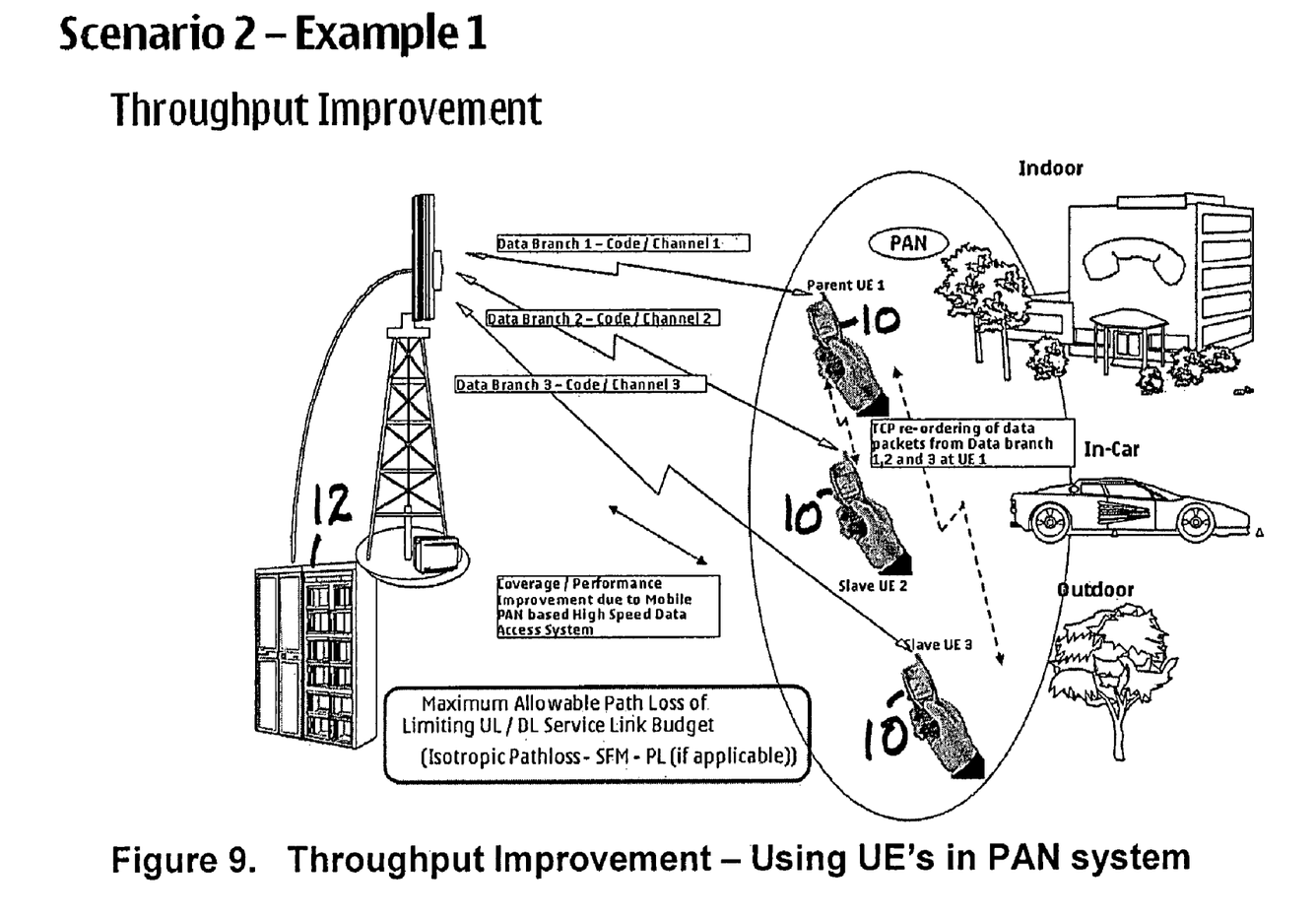
FIG. 9 illustrates a throughput improvement using UEs in a PAN system.
Figure 10:
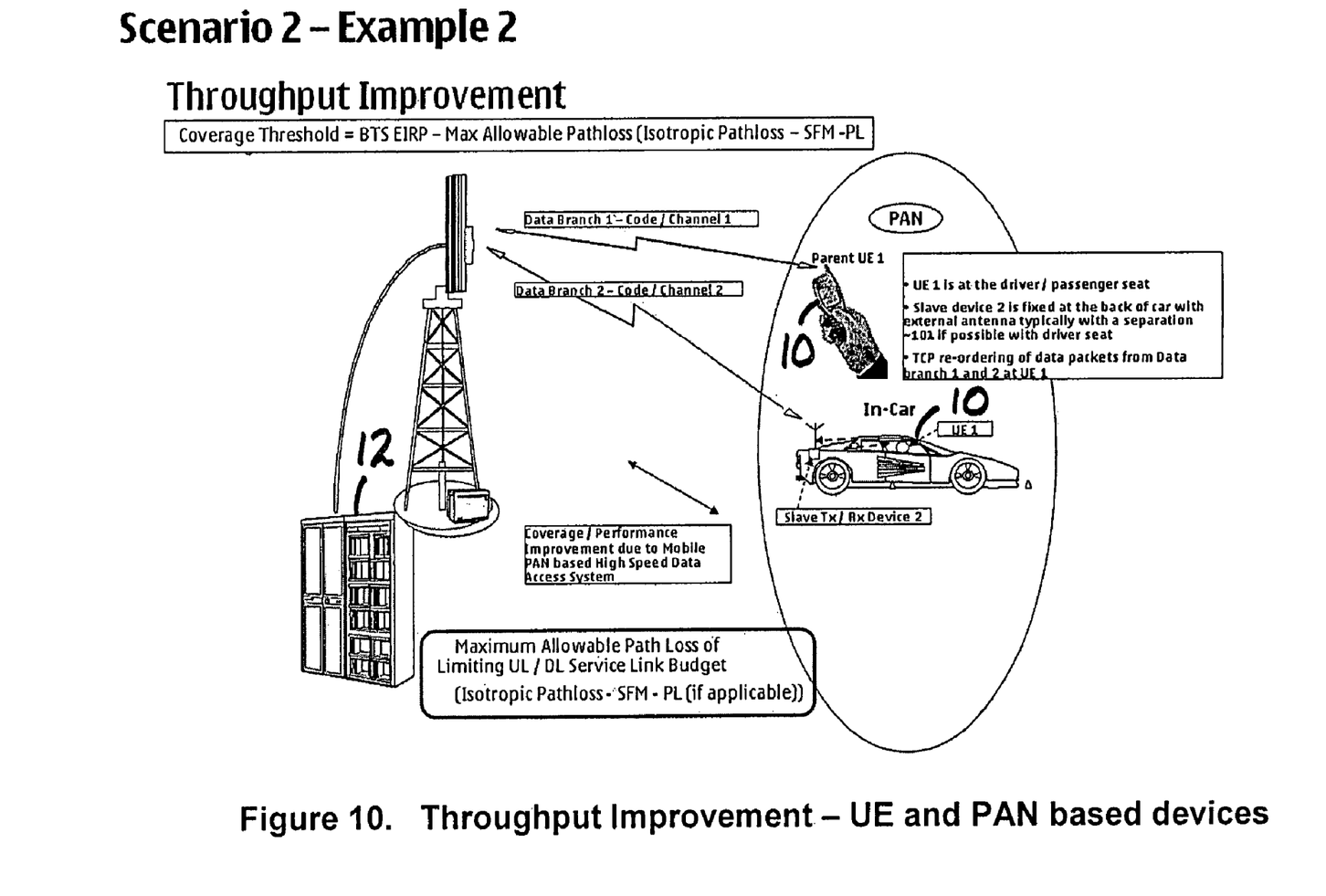
FIG. 10 illustrates a throughput improvement for UE and PAN-based devices.

It can also be observed from FIGS. 7 and 8 that throughput improvements can be achieved using the mobile PAN-based high speed data access system in accordance with the exemplary embodiments of this invention, wherein parallel data pipes are employed to achieve higher data throughput. FIGS. 9 and 10 illustrate examples of how this can be achieved. The details of the operation have been discussed above with reference to FIGS. 1-6.

It can be noted that an application for subscription of services may reside at one of the IP Multimedia Sub-System/Multimedia server 80 or the GGSN 60, or in a similar routing entity.

Based on the foregoing description it should be appreciated that the use of the exemplary embodiments of this invention provides a reduced complexity and cost approach to achieve higher data rates as compared to, for example, a MIMO approach as proposed for next generation wireless communications systems. Further, the use of the exemplary embodiments of this invention provides true Tx and Rx space diversity to be achieved with the mobile terminal, and additionally provides a performance improvement in coverage and capacity. Relatedly, mobile device Tx and Rx diversity gains in an exemplary rage of about 2 dB to 3 dB are achievable. In addition, the use of the exemplary embodiments of this invention enable higher data rates can be achieved with decreased error probabilities due to the combined capabilities of mobile devices within the PAN network. Still further, the use of the exemplary embodiments of this invention is backwards compatible with existing wireless communications standards and specifications, such as 3G/2G standards and specifications, and enables increased data speeds and performance in current systems and terminals/devices having low to moderate capabilities. Still further, the use of the exemplary embodiments of this invention is also forward compatible and complements with future wireless communications standards and specifications, such as 3.9G/4G standards and specifications, and can enable even more increased data speeds and performance than the future 3.9G/4G systems may be capable independently and also provide similar gain to terminals/devices having low to moderate capabilities. Still further, it should be appreciated that the use of the exemplary embodiments of this invention provides a re-cycling alternative for mobile devices having PAN capability (such as Bluetooth™ capability), as such devices may be used as fixed (non-mobile) Tx/Rx devices within buildings and vehicles, and may thus function as spatially distributed wireless routers for a particular UE.

In general, the various embodiments of the UE(s) 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as fixed and portable units or terminals that incorporate combinations of such functions.

The embodiments of this invention may be implemented by computer software executable by a data processor of the UE 10 (such as the control unit 11) and other data processors of various ones of the wireless network components and devices, or by hardware or by firmware, or by a combination of software, hardware and firmware.

In general, the various embodiments discussed above may be implemented in hardware or special purpose circuits, software, logic or any combination thereof. For example, some aspects may be implemented in hardware, while other aspects may be implemented in firmware or software which may be executed by a control unit, microprocessor or other computing device, although the invention is not limited thereto. While various aspects of the invention may be illustrated and described as block diagrams, message flow diagrams, or by using some other pictorial representation, it is well understood that these blocks, apparatus, systems, techniques or methods described herein may be implemented in, as non-limiting examples, hardware, software, firmware, special purpose circuits or logic, general purpose hardware or control unit or other computing devices, or some combination thereof.

Relatedly, embodiments of the invention may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description when read in conjunction with the accompanying drawings.

As one non-limiting example, it is within the scope of the exemplary embodiments of this invention for the parent UE 1 to first contact and negotiate with (recruit) one or more neighboring UEs in the PAN before executing the steps 4A, 5A and 6A to setup the RAB with the core network. This may be advantageous in a case where, by example, the UE 1 requires some certain QoS (Quality of Service) for a data transmission that can only be achieved with the aid of at least one additional UE in the PAN. Only after having assured that the minimum number of other UEs are available to support the desired QoS does the UE 1 contact the core network to establish the required radio bearer(s). In this case the core network can be informed of the identities of the recruited neighboring UEs during the initial bearer setup procedure, by making a suitable modification to the existing signaling for this purpose, or the separate messaging (e.g., steps 4C, 5C, 6C) can be performed as discussed above. In this case the recruited UEs may then be informed of the channel/code(s) that are allocated to the UE 1 by the core network as described above.

Further, it should be appreciated that the master UE (UE 1) may be simultaneously functioning as a slave UE for another UE, even one of its own slave UEs, that may also be engaged in transmitting and/or receiving packet data, such as by the use of another code channel on the uplink/downlink with the BS 12.

It may also be appreciated that at the UE1 can include an application and a user interface for user-level acknowledgement for agreement to use the wireless device and its resources to negotiate, establish, maintain and breakdown a connection path with at least one other wireless device.

However, any and all such and similar modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

What is claimed is:

1. A method, comprising:
   with a parent user equipment, establishing a packet data protocol context and being assigned an internet protocol address by a wireless network;
   establishing a wireless network radio access bearer and a data channel;
   initiating a session between the parent user equipment and a server;
   scanning for at least one other user equipment in a personal area network of the parent user equipment, and establishing communication with the at least one other user equipment;
   sending a personal access network user group report containing information for at least identifying the at least one other user equipment;
   in response to the parent user equipment receiving from the server a session personal access network user group identification number to the parent user equipment and to the wireless network element, sending the personal access network user group identification number from the parent user equipment to the at least one other user equipment; and
   in response to the parent user equipment receiving a personal access network user group reporting confirm message, instructing the at least one other user equipment to initiate a session with wireless network.

2. The method of claim 1, further comprising:
   passing at least the reported personal access network user group identification number and internet protocol address from the server to the wireless network element to update a personal access network user group routing table.

3. The method of claim 1, further comprising:
   passing at least the personal access network user group identification number and a packet data protocol context number for the at least one other user equipment to the server; and
   forwarding at least the personal access network user group identification number and a packet data protocol context number to the wireless network element.

4. The method of claim 1, where the wireless network element comprises a gateway general packet radio Support Node.

5. The method of claim 1, where the server comprises an internet protocol multimedia sub-system/multimedia server.

6. The method of claim 1 further comprising reporting at least the personal access network user group identification number and internet protocol address to the server.

7. A computer program product comprising program instructions embodied on a computer readable media for execution by a data processor, execution of program instructions resulting in operations comprising:

with a parent user equipment, establishing a packet data protocol context and being assigned an internet protocol address by a wireless network element;

establishing a wireless network radio access bearer and a data channel;

initiating a session between the parent user equipment and a server;

scanning for at least one other user equipment in a personal area network of the parent user equipment, and establishing communication and negotiating for resources with the at least one other user equipment;

sending a personal access network user group report containing information for at least identifying the at least one other user equipment;

receiving a session personal access network user group identification number;

sending the personal access network user group identification number from the parent user equipment to the at least one other user equipment;

receiving a personal access network user group reporting confirm message; and instructing the at least one other user equipment to initiate a session with the wireless network comprising reporting at least the personal access network user group identification number and internet protocol address to the server.

8. The computer program product of claim 7, further comprising:

passing at least the reported personal access network user group identification number and internet protocol address from the server to the wireless network element to update a personal access network user group routing table;

in response to receiving a data transfer request from the at least one other user equipment, sending from the server a confirmation message; and the wireless network element beginning load sharing between the parent user equipment and the at least one other user equipment for incoming data flow to the parent user equipment across routes defined as per the personal access network user group routing table.

9. The computer program product of claim 7, further comprising:

the at least one other user equipment establishing a data pipe with the wireless network element and informing the parent user equipment of the data pipe identification;

passing at least the personal access network user group identification number and a packet data protocol context number for the at least one other user equipment to the server;

forwarding at least the personal access network user group identification number and a packet data protocol context number to the wireless network element; and the wireless network element beginning load sharing between the parent user equipment and the at least one other user equipment for incoming data flow to the parent user equipment across routes defined as per a personal access network user group routing table.

10. The computer program product of claim 7, further comprising:

the wireless network element initiating data pipe setup for the at least one other user equipment by sending a paging command on the down link;

the at least one other user equipment, in response, establishing the data pipe;

informing the parent user equipment of an identification of the data pipe;

passing the data pipe identification to the server;

sending the data pipe identification from the server to the wireless network element; and the wireless network element beginning load sharing between the parent user equipment and the at least one other user equipment for incoming data flow to the parent user equipment across routes defined as per a personal access network user group routing table.

11. The computer program product of claim 7, where internet protocol tunneling is performed between the parent user equipment and the at least one other user equipment.

12. The computer program product of claim 7, where the wireless network element comprises a gateway general packet radio service Support Node or similar routing entity.

13. The computer program product of claim 7, where the server comprises an internet protocol multimedia sub-system/multimedia server.

14. The computer program product of claim 7, further comprising operations of performing a billing function for the parent user equipment based at least on a personal access network user group routing table.

15. The computer program product of claim 7, where an application for subscription of services resides at one of an internet protocol multimedia sub-system/multimedia server and a gateway general packet radio service support node or similar routing entity.

* * * * *